(12) United States Patent
Moritomi et al.

(10) Patent No.: US 7,790,808 B2
(45) Date of Patent: Sep. 7, 2010

(54) METHOD FOR PRODUCING A THERMOPLASTIC RESIN COMPOSITION

(75) Inventors: Satoru Moritomi, Chiba (JP); Takashi Sanada, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 281 days.

(21) Appl. No.: 11/272,031

(22) Filed: Nov. 14, 2005

(65) Prior Publication Data

US 2006/0106170 A1    May 18, 2006

(30) Foreign Application Priority Data

Nov. 16, 2004    (JP)    ............................. 2004-331474

(51) Int. Cl.
*C08L 9/00*    (2006.01)
*C08L 23/00*    (2006.01)
*C08L 25/02*    (2006.01)
*C08L 33/02*    (2006.01)
*C08F 8/00*    (2006.01)

(52) U.S. Cl. .................. 525/191; 525/221; 525/232; 525/240; 525/241

(58) Field of Classification Search .............. 525/191, 525/221, 232, 240, 241
See application file for complete search history.

(56) References Cited

U.S. PATENT DOCUMENTS

| | | | | |
|---|---|---|---|---|
| 5,216,075 | A * | 6/1993 | Papazoglou | .................. 525/66 |
| 5,420,198 | A * | 5/1995 | Papazoglou et al. | .......... 525/66 |
| 6,399,709 | B1 | 6/2002 | Moriguchi et al. | |
| 6,723,776 | B2 * | 4/2004 | Sakaki et al. | ............... 524/474 |

FOREIGN PATENT DOCUMENTS

JP    2000-26697 A    1/2000

* cited by examiner

*Primary Examiner*—Nathan M Nutter
(74) *Attorney, Agent, or Firm*—Foley & Lardner LLP

(57) ABSTRACT

Disclosed is a method for producing a thermoplastic resin composition, the method including a first step of melt-kneading 100 parts by weight component (A) and from 15 to 200 parts by weight of component (B) to form a melt-kneaded material, and a second step of melt-kneading from 35 to 2300 parts by weight of additional component (B) with the melt-kneaded material formed in the first step, wherein component (A) is an elastomer having a melt viscosity, as measured at a temperature of 230° C. and a shear rate of 121 $sec^{-1}$, of 1500 Pa·s or more and the component (B) is a polyolefin resin.

2 Claims, No Drawings

METHOD FOR PRODUCING A THERMOPLASTIC RESIN COMPOSITION

BACKGROUND OF THE INVENTION

1. Field of the Invention

The present invention relates to a method for producing a thermoplastic resin composition, and particularly, to a method for producing a thermoplastic resin composition which is useful as a material for forming a molded article superior in impact resistance and appearance.

2. Description of the Related Art

Molded articles of polypropylene resins are used in a wide variety of applications due to their superior rigidity, heat resistance and surface luster.

It is known that incorporating an elastomer into a polypropylene resin improves the impact resistance.

For example, JP 2000-26697 A discloses a propylene resin composition superior in processability, physical property balance, low-lustrousness and weld appearance, wherein the composition comprises a propylene-ethylene block copolymer, an ethylene-α-olefin copolymer rubber or propylene-α-olefin-diene copolymer rubber having an MFR of from 0.05 to 1.2 g/10 min., talc and a high density polyethylene.

U.S. Pat. No. 6,399,709 discloses a thermoplastic elastomer composition having a uniformly distributed composition ratio of olefin copolymer rubber and olefin polymer resin and being superior in anti-fogging property, the composition being prepared by feeding a rubber and a thermoplastic resin into an extruder through different feed ports and melt-kneading them.

In the thermoplastic resin compositions disclosed in the above-cited references, the elastomer is not always dispersed sufficiently and further improvement in impact resistance and appearance of molded articles has been demanded.

SUMMARY OF THE INVENTION

Under such circumstances, an object of the present invention is to provide a thermoplastic resin composition which is useful as a material for forming a molded article superior in impact resistance and appearance.

The present invention provides, in one aspect, a method for producing a thermoplastic resin composition, the method comprising a first and a second step defined below:

first step: a step of melt-kneading 100 parts by weight component (A) defined below and from 15 to 200 parts by weight of component (B) defined below to form a melt-kneaded material;

second step: a step of melt-kneading from 35 to 2300 parts by weight of additional component (B) with the melt-kneaded material formed in the first step;

component (A): an elastomer having a melt viscosity, as measured at a temperature of 230° C. and a shear rate of 121 sec$^{-1}$, of 1500 Pa·s or more;

component (B): a polyolefin resin.

By use of the present invention, it is possible to obtain a thermoplastic resin composition which is useful as a material for forming a molded article superior in impact resistance and appearance.

DESCRIPTION OF THE PREFERRED EMBODIMENTS

The component (A) used in the present invention is an elastomer having a melt viscosity, as measured at a temperature of 230° C. and a shear rate of 121 sec$^{-1}$, of 1500 Pa·s or more.

Examples of the type of the elastomer include natural rubber, polybutadiene, and polyisoprene rubber, butyl rubber, ethylene-α-olefin copolymer rubber, butadiene-styrene copolymer rubber, butadiene-acrylonitrile copolymer rubber, hydrogenated or unhydrogenated (aromatic vinyl compound)-(conjugated diene) block copolymer rubber, polyester rubber, acrylic rubber, silicone rubber and modified products thereof. In the following description, unless otherwise stated, hydrogenated (aromatic vinyl compound)-(conjugated diene) block copolymer rubber and unhydrogenated (aromatic vinyl compound)-(conjugated diene) block copolymer rubber are collectively called "(aromatic vinyl compound)-(conjugated diene) block copolymer rubber".

Preferable examples of the component (A) include (aromatic vinyl compound)-(conjugated diene) block copolymer rubber, ethylene-α-olefin random copolymer rubber and propylene-α-olefin random copolymer rubber.

Examples of the (aromatic vinyl compound)-(conjugated diene) block copolymer rubber to be used as the component (A) include hydrogenated or unhydrogenated block copolymers composed of an aromatic vinyl compound polymer block and a conjugated diene polymer block. The (aromatic vinyl compound)-(conjugated diene) block copolymer rubber preferably is a hydrogenated product resulting from hydrogenation of from 80% to 100%, more preferably from 85% to 100%, of the double bonds of the conjugated diene portions of an unhydrogenated block copolymer composed of an aromatic vinyl compound polymer block and a conjugated diene polymer block.

The ratio of the weight average molecular weight Mw to the number average molecular weight Mn of the (aromatic vinyl compound)-(conjugated diene) block copolymer rubber, as determined by GPC (gel permeation chromatography), is preferably from 1.0 to 2.5, more preferably from 1.0 to 2.3. The ratio of Mw to Mn is generally referred to as molecular weight distribution or Q factor.

The average content of the moieties derived from aromatic vinyl compounds included in the (aromatic vinyl compound)-(conjugated diene) block copolymer rubber is preferably from 10 to 35% by weight, more preferably from 12 to 25% by weight.

Specific examples of the (aromatic vinyl compound)-(conjugated diene) block copolymer rubber include block copolymers such as styrene-ethylene-butylene-styrene rubber (SEBS), styrene-ethylene-propylene-styrene rubber (SEPS), styrene-butadiene-styrene rubber (SBS) and styrene-isoprene-styrene rubber (SIS), each of which may be hydrogenated.

In addition, a rubber prepared by reacting an aromatic vinyl compound such as styrene with an olefinic copolymer rubber such as ethylene-propylene-non-conjugated diene rubber (EPDM) can be preferably used. Two or more (aromatic vinyl compound)-(conjugated diene) block copolymer rubbers may be used together.

The ethylene-α-olefin random copolymer rubber used as the component (A) is a random copolymer rubber comprising ethylene and an α-olefin.

The α-olefin in the ethylene-α-olefin is typically an α-olefin having at least 3 carbon atoms, examples of which include propylene, butene-1, pentene-1, hexene-1, heptene-1, octene-1 and decene. Propylene, butene-1, hexene-1 and octene-1 are preferred. A single α-olefin may be used. Alternatively, two or more α-olefins may also be used in combination.

Specific examples of the ethylene-α-olefin random copolymer rubber include an ethylene-propylene random copolymer, an ethylene-butene-1 random copolymer, an ethylene-hexene-1 random copolymer, an ethylene-octene-1 random copolymer, an ethylene-propylene-butene-1 random copolymer, etc. The ethylene-octene-1 random copolymer, the ethylene-butene-1 random copolymer and the ethylene-hexene-1 random copolymer are preferred. A single ethylene-α-olefin random copolymer rubber may be used. Alternatively, two or more ethylene-α-olefin random copolymer rubbers may also be used in combination.

The specific gravity of the ethylene-α-olefin random copolymer rubber is preferably from 0.86 to 0.91, more preferably from 0.86 to 0.90, and even more preferably from 0.86 to 0.895.

The propylene-α-olefin random copolymer rubber used as the component (A) is a random copolymer rubber comprising propylene and an α-olefin.

The α-olefin in the propylene-α-olefin random copolymer rubber is an α-olefin having 4 or more carbon atoms, specific examples of which include the α-olefins, except propylene, provided as the examples of the α-olefin in the aforementioned ethylene-α-olefin copolymer rubber having 3 or more carbon atoms. A single α-olefin may be used. Alternatively, two or more α-olefins may also be used in combination.

Examples of the propylene-α-olefin random copolymer rubbers include a propylene-butene-1 random copolymer rubber, a propylene-hexene-1 random copolymer rubber and a propylene-octene-1 random copolymer rubber. The propylene-butene-1 random copolymer rubber is preferred. A single propylene-α-olefin random copolymer rubber may be used. Alternatively, two or more propylene-α-olefin random copolymer rubbers may also be used in combination.

The elastomer used as the component (A) has a melt viscosity, as measured at a temperature of 230° C. and a shear rate of 121 sec$^{-1}$, is 1500 Pa·s or more. If the melt viscosity is too low, the impact strength may be insufficient. For improving the dispersibility of the elastomer, the melt viscosity is preferably from 1500 Pa·s to 4000 Pa·s.

The component (B) used in the present invention is a polyolefin resin excluding the component (A).

The polyolefin resin is a homopolymer or copolymer of olefin.

Examples of the olefin include α-olefin and cyclic olefin. Examples of the α-olefin include ethylene, propylene, butene-1, pentene-1, hexene-1, 3-methylbutene-1, 4-methylpentene-1, octene-1, decene-1, dodecen-1, tetradecene-1, hexadecene-1, octadecene-1 and eicosene-1. Examples of the cyclic olefin include the cyclic olefins disclosed in JP 2-115248 A.

Additional examples of the component (B) include a copolymer obtained by copolymerizing an olefin and a small amount of another unsaturated monomer, and modified products obtained by modifying, by oxidization, sulfonation or the like, the aforementioned homopolymer or copolymer of olefin or copolymer obtained by copolymerizing an olefin and a small amount of another unsaturated monomer.

Examples of the unsaturated monomer of use in the copolymer obtained by copolymerizing an olefin and a small amount of another unsaturated monomer include: unsaturated organic acids or their derivatives such as acrylic acid, methacrylic acid, maleic acid, itaconic acid, methyl acrylate, methyl methacrylate, maleic anhydride, aryl maleic acid imide and alkyl maleic acid imide; vinyl esters such as vinyl acetate and vinyl butyrate; aromatic vinyl compounds such as styrene and methylstyrene; vinylsilane such as vinyl trimethylmethoxysilane and γ-methacryloyloxypropyltrimethoxysilane; and nonconjugated diene such as dicyclopentadiene, 4-ethylidene-2-norbornene, 4-methyl-1,4-hexadiene and 5-methyl-1,4-hexadiene.

The component (B) is preferably any of homopolymers of ethylene, propylene, butene-1,3-methylbutene-1 or 4-methylpentene-1 and copolymers including a majority of at least one monomer selected from ethylene, propylene, butene-1, 3-methylbuten3-1 and 4-methylpentene-1, more preferably is crystalline propylene polymer, and even more preferably a propylene homopolymer, a propylene-ethylene block copolymer, a propylene-ethylene random copolymer, or a mixture of two or more of them.

The melt flow rate (MFR), as measured at a temperature of 230° C., a load of 21.2 N, of the component (B) is preferably from 0.01 to 400 g/10 min., more preferably from 0.1 to 200 g/10 min.

The melt viscosity, as measured at a temperature of 230° C., a shear rate of 121 sec$^{-1}$, of the component (B) is preferably from 1 to 300 Pa·sec, more preferably from 10 to 200 Pa·sec.

The component (B) may be prepared by a conventional polymerization or modification technique. Alternatively, a properly selected, commercially available product may be used.

The method of the present invention include a first and a second step defined below:

first step: a step of melt-kneading 100 parts by weight component (A) described above and from 15 to 200 parts by weight of component (B) described above to form a melt-kneaded material;

second step: a step of melt-kneading from 35 to 2300 parts by weight of additional portion of component (B) described above with the melt-kneaded material formed in the first step;

In the method of the present invention, the whole portion of component (A) which will be included in the thermoplastic resin composition finally obtained is added in the first step, whereas component (B) is added in two separate portions, one of which is added in the first step and melt-kneaded with component (A) and the remainder is added in the second step.

The first step is a step of melt-kneading 100 parts by weight component (A) and from 15 to 200 parts by weight of component (B). Use of too little or too much component (B) in the first step will result in poor dispersion of component (A), which may deteriorate the impact-resisting strength or appearance of molded articles made of the thermoplastic resin composition.

The second step is a step of melt-kneading from 35 to 2300 parts by weight of additional portion of component (B) with the melt-kneaded material formed in the first step. The amount of the component (B) added is preferably from 50 to 2100 parts by weight, more preferably from 85 to 2000 parts by weight. Use of too little or too much component (B) may deteriorate the impact-resisting strength or appearance of molded articles made of the thermoplastic resin composition.

The combined amount of the component (B) used in the first step and in the second step is preferably from 50 to 2500 parts by weight per 100 parts by weight of the component (A) used in the first step. For improving the rigidity or impact-resisting strength of molded articles made of the thermoplastic resin composition, the combined amount of component (B) is more preferably from 85 to 2300 parts by weight, and even more preferably from 100 to 2200 parts by weight.

The melt-kneading may be carried out by use of a mixing device, including a Bambury mixer, a plastomill, a Brabender plastograph, a single screw extruder and a twin screw extruder.

The method for the melt-kneading may be, for example:

(1) a method in which, after the first step, the resulting melt-kneaded material is cooled to solidify and processed into a desired form, such as pellets, and then the second step is carried out, and (2) a method in which, after the first step, a desired amount of component (B) is added to the resulting melt-kneaded material and then the second step is carried out.

The method of the melt-kneading is preferably, from an economic viewpoint, a method using an extruder with two or more feeding ports, the method comprising adding 100 parts by weight of component (A) and from 15 to 200 parts by weight of component (B) through a feeding port located upstream, carrying out a first melt-kneading, feeding a predetermined amount of additional component (B) through a feeding port located downstream from the region of the first melt-kneading, and carrying out a second melt-kneading continuously.

The thermoplastic resin composition of the present invention may contain other thermoplastic resins or additives such as antioxidants, UV absorbers, pigments, antistatic agents, copper inhibitors, flame retardants, neutralizing agents, foaming agents, plasticizers, nucleating agents, foam inhibitors, crosslinking agents and lubricants, if desired.

Molded articles of the thermoplastic resin composition of the present invention can be produced by a method in which the thermoplastic resin composition is subjected to a molding process, such as injection molding, extrusion forming, compression molding and blow molding, directly or after its melt-kneading with another thermoplastic resin.

Examples of the applications of molded articles made of the thermoplastic resin composition of the present invention include automotive components, components of electric and electronic appliances, building material components; and preferably automotive components such as door trims, body side moldings, fenders, fender guards, side sill garnishes, bumpers, bumper skirts, spoilers, mudguards, inner panels, pillars and instrument panels.

EXAMPLES

The present invention is described in more detail below with reference to examples and comparative examples.

Provided below are the method for measuring the melt viscosity of the thermoplastic resin compositions used in the examples and comparative examples, the method for evaluating the Izod impact strength, the method for evaluating the appearance, and the components used and their abbreviations.

(1) Melt Viscosity (Unit: Pa·s)

The melt viscosity was measured at a temperature of 230° C. and a shear rate of 121 sec$^{-1}$ using a Capillograph IB (manufactured by Toyo Seiki Seisaku-Sho, Ltd.) with a capillary tube having an L/D of 40 mm/1 mm.

(2) Measurement of Izod Impact Strength (Unit: kJ/m$^2$)

The Izod impact strength was measured according to the method provided in JIS K7110. The test piece used was 3.2 mm in thickness and had a notch. The measuring temperature was 23° C.

(3) Evaluation of Appearance of Molded Article

The surface condition of a strand produced by melt-kneading was visually observed.

○: No irregularity was found.

Δ: Irregularity was found in a part of the strand surface.

X: Irregularity was found almost throughout the strand surface.

(4) Measurement of the Number of Fish Eyes

Using a thermoplastic resin obtained by melt-kneading, a film 50 mm in width and 50 μm in thickness was produced by use of a 20-mmφ extruder (V-20 manufactured by Tanabe plastic Machine Co., Ltd.) and a haul-off device.

Images (900 dpi, 8 bit) of the resulting film were captured into a computer by a scanner GT-9600 manufactured by EPSON, and the images were binarized by means of image analysis software, A zo-kun available from Asahi Engineering Co., Ltd. Fish eyes were recognized as brighter places than surrounding areas. Because the fish eyes had irregular forms, the diameter of a circle having the same area as that of a fish eye was used as the size of the fish eye, and the number of fish eyes having a diameter of 200 μM or more per 100 cm$^2$ of the film was counted.

In the examples and comparative examples, the components listed below were used.

SEPS: Styrene-Ethylene-Propylene-Styrene Rubber

SEPTON 2005 (Trademark) manufactured by Kuraray Co., Ltd.

Styrene content: 20% by weight

Specific gravity: 0.89

Melt viscosity at a temperature of 230° C. and a shear rate of 121 sec$^{-1}$: 3540 Pa·s PP: Polypropylene Resin Propylene homopolymer having a structure shown below produced using a catalyst disclosed in JP 10-212319 A.

Intrinsic viscosity: 0.9 dl/g

Isotactic pendant fraction: 0.99

MFR (230° C., 21 N): 120 g/10 min.

Melt viscosity at a temperature of 230° C. and a shear rate of 121 sec$^{-1}$: 25.5 Pa·s Example 1

Into a twin screw extruder with three feeding ports (made by TEM50A Toshiba Machine Co., Ltd.), 100 parts by weight of SEPS and 50 parts by weight of PP were fed through the first port located most upstream and melt-kneaded at a cylinder temperature of 230° C. and a screw speed of 200 rpm. Continuously, 350 parts by weight of PP were fed through the second port downstream from the first port and melt-kneaded at a cylinder temperature of 230° C. and a screw speed of 200 rpm. The kneaded material was extruded to form a strand, which was cooled in a water bath and pelletized with a pelletizer.

The resulting resin composition was injection molded to form a 3.2-mm thick test piece at a cylinder temperature of 230° C. and a mold temperature of 50° C. Using the test piece, the Izod impact strength was measured.

In addition, a film was prepared from the resin composition and the number of fish eyes was counted. The results are shown in Table 1.

Examples 2, 3

The operations were carried out in the same manner as Example 1 except the components shown in Table 1 were fed through the first port located most upstream and the second port located downstream from the first port. The results are shown in Table 1.

Comparative Example 1

The operations were carried out in the same manner as Example 1 except the components shown in Table 1 were fed through the first port located most upstream and no component (B) was fed through the second port located downstream. The results are shown in Table 1.

Comparative Example 2

The operations were carried out in the same manner as Example 1 except that no component (B) was fed through the first port located most upstream and the components shown in Table 1 were fed through the second port located downstream from the first port. The results are shown in Table 1.

TABLE 1

|  |  | Example | | | Comparative Example | |
| --- | --- | --- | --- | --- | --- | --- |
|  |  | 1 | 2 | 3 | 1 | 2 |
| First step | SEPS | 100 | 100 | 100 | 100 | 100 |
|  | PP | 50 | 100 | 25 | 400 | 0 |
| Second step | PP | 350 | 300 | 375 | 0 | 400 |
| Flexural modulus (MPa) |  | 1000 | 1000 | 1030 | 990 | 1010 |
| Izod impact strength (kJ/m$^2$) |  | 25 | 12 | 15 | 9 | 7 |
| Appearance of molded article |  | ○ | ○ | ○ | x | x |
| The number of fish eyes |  | 10 | 180 | 120 | 3400 | 12000 |

What is claimed is:

1. A method for producing a thermoplastic resin composition, the method using an extruder with two or more feeding ports and comprising a first and second steps defined below:

first step: a step of adding 100 parts by weight of component (A) defined below and from 15 to 200 parts by weight of component (B) defined below to the extruder through a feeding port located upstream, followed by melt-kneading components (A) and (B) to form a melt-kneaded material;

second step: a step of feeding from 35 to 2300 parts by weight of additional component (B) through a feeding port located downstream from the region where the melt-kneading is carried out, followed by melt-kneading the additional component (B) with the melt-kneaded material formed in the first step;

component (A): an elastomer having a melt viscosity, as measured at a temperature of 230° C. and a shear rate of 121 sec$^{-1}$, of 1500 Pa·s or more;

component (B): a polyolefin resin selected from the group consisting of a propylene homopolymer, a propylene-ethylene block copolymer, a propylene-ethylene random copolymer, and a mixture thereof.

2. A thermoplastic resin composition obtained by the method according to claim 1.

* * * * *